United States Patent [19]

Manley

[11] Patent Number: 5,752,636
[45] Date of Patent: May 19, 1998

[54] TRUCK BED EXTENDER

[76] Inventor: Christopher D. Manley, 25 Scott Pl., Clinton, N.C. 28328

[21] Appl. No.: 746,119

[22] Filed: Nov. 6, 1996

[51] Int. Cl.[6] .................. B60R 7/00; B60R 7/12; B60R 7/14; B60R 9/00
[52] U.S. Cl. .................. 224/405; 224/403; 224/488; 224/495; 224/502; 224/506; 224/511; 224/512; 224/519; 296/26; 414/462
[58] Field of Search ............. 224/403, 405, 224/282, 488, 495, 502, 504, 506, 511, 512, 519, 521, 924; 280/35, 78, 638, 639; 108/44; 296/26; 414/462

[56] References Cited

U.S. PATENT DOCUMENTS

| | | | |
|---|---|---|---|
| 4,635,835 | 1/1987 | Cole | 224/521 |
| 5,094,373 | 3/1992 | Lovci | 224/924 |
| 5,330,084 | 7/1994 | Peers | 224/506 |
| 5,458,389 | 10/1995 | Young | 296/26 |
| 5,615,813 | 4/1997 | Ouellette | 224/405 |

*Primary Examiner*—Henry J. Recla
*Assistant Examiner*—Timothy L. Maust
*Attorney, Agent, or Firm*—Rhodes, Coats & Bennett, L.L.P.

[57] ABSTRACT

A truck bed extender mounts to a vehicle to support loads which are longer than the load bed of the vehicle. The truck bed extender includes a main beam adapted to engage a conventional box receiver on the vehicle. A load support is mounted to the main beam and includes a load support bar which extends transversely to the main beam when the truck bed extender is in use. A storage mount is provided to allow mounting of the load support to the main beam in a storage position when the load support is not being used. The truck bed extender can be mounted to the box receiver in a storage position.

21 Claims, 4 Drawing Sheets

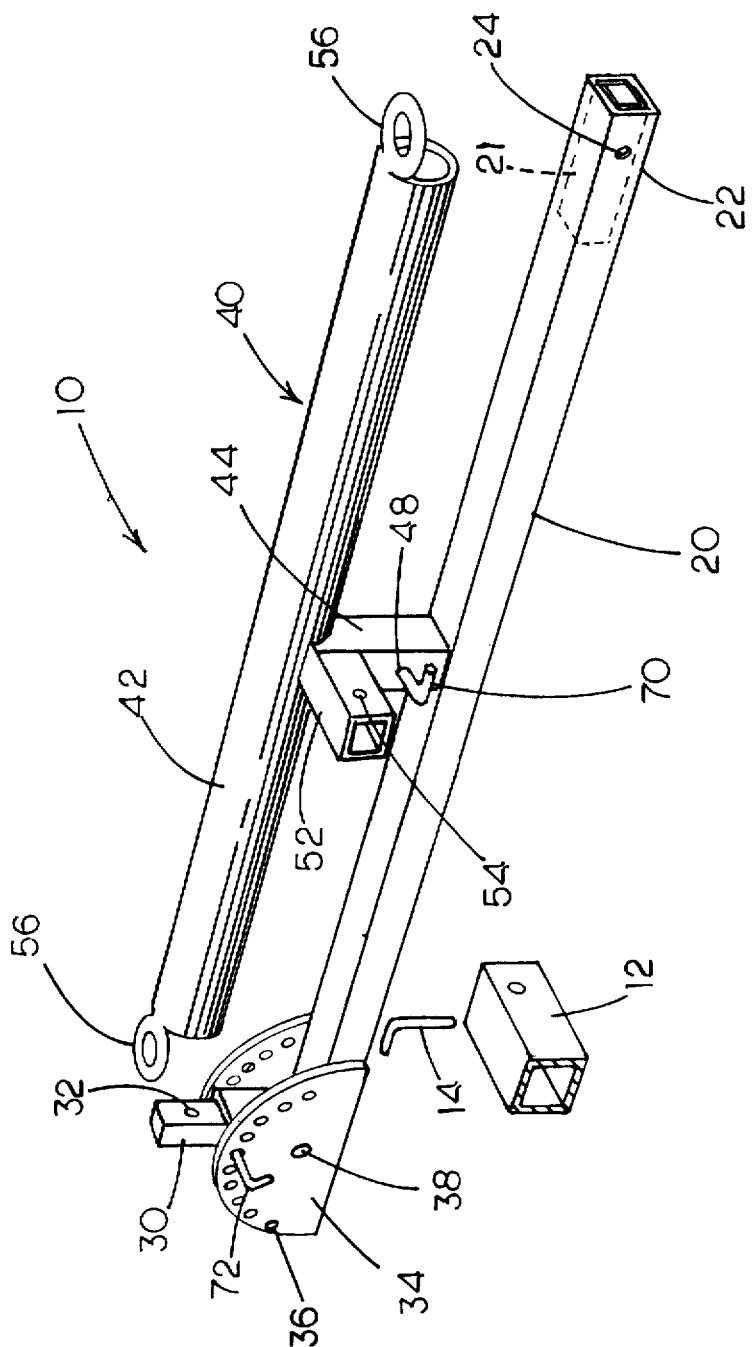

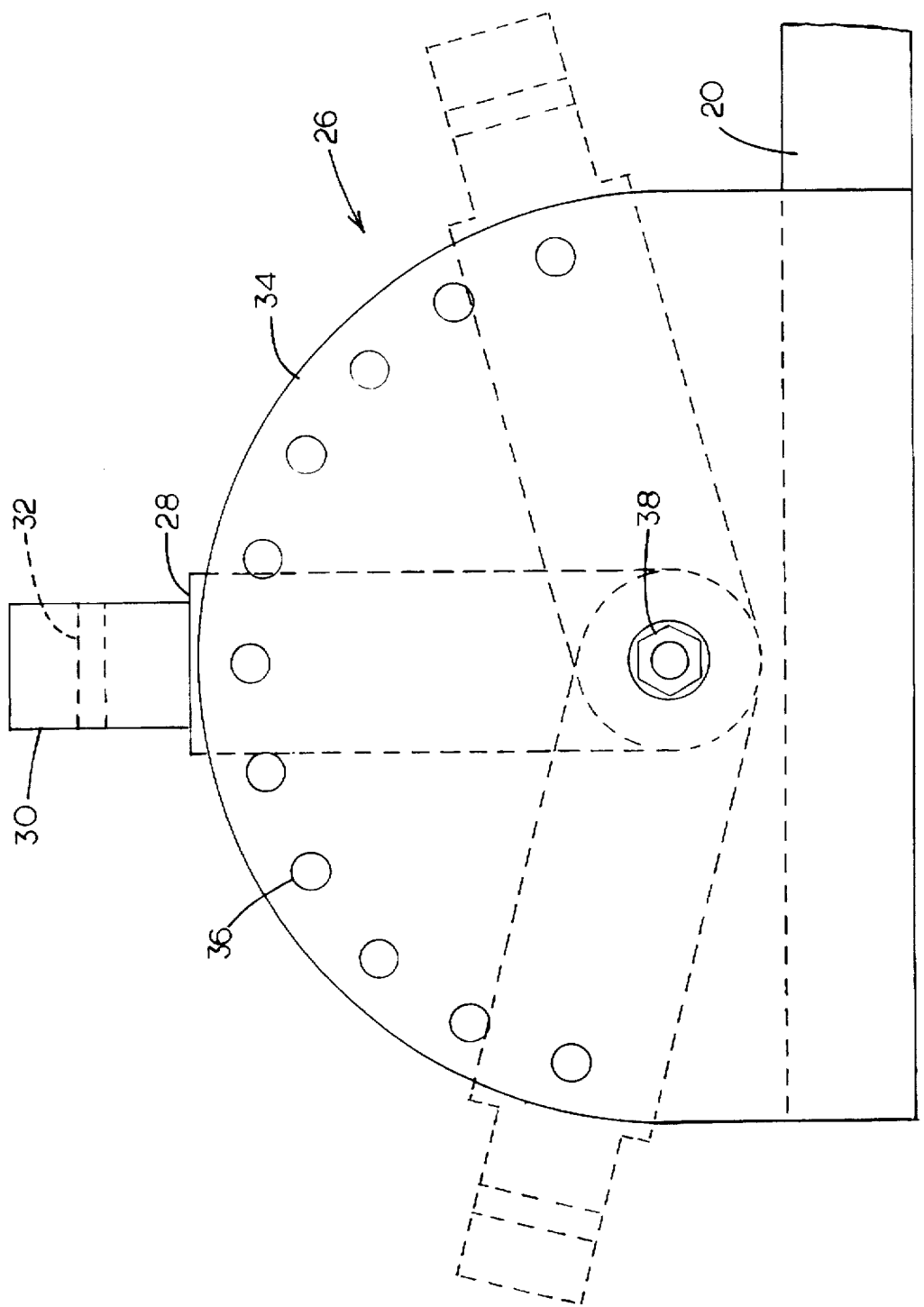

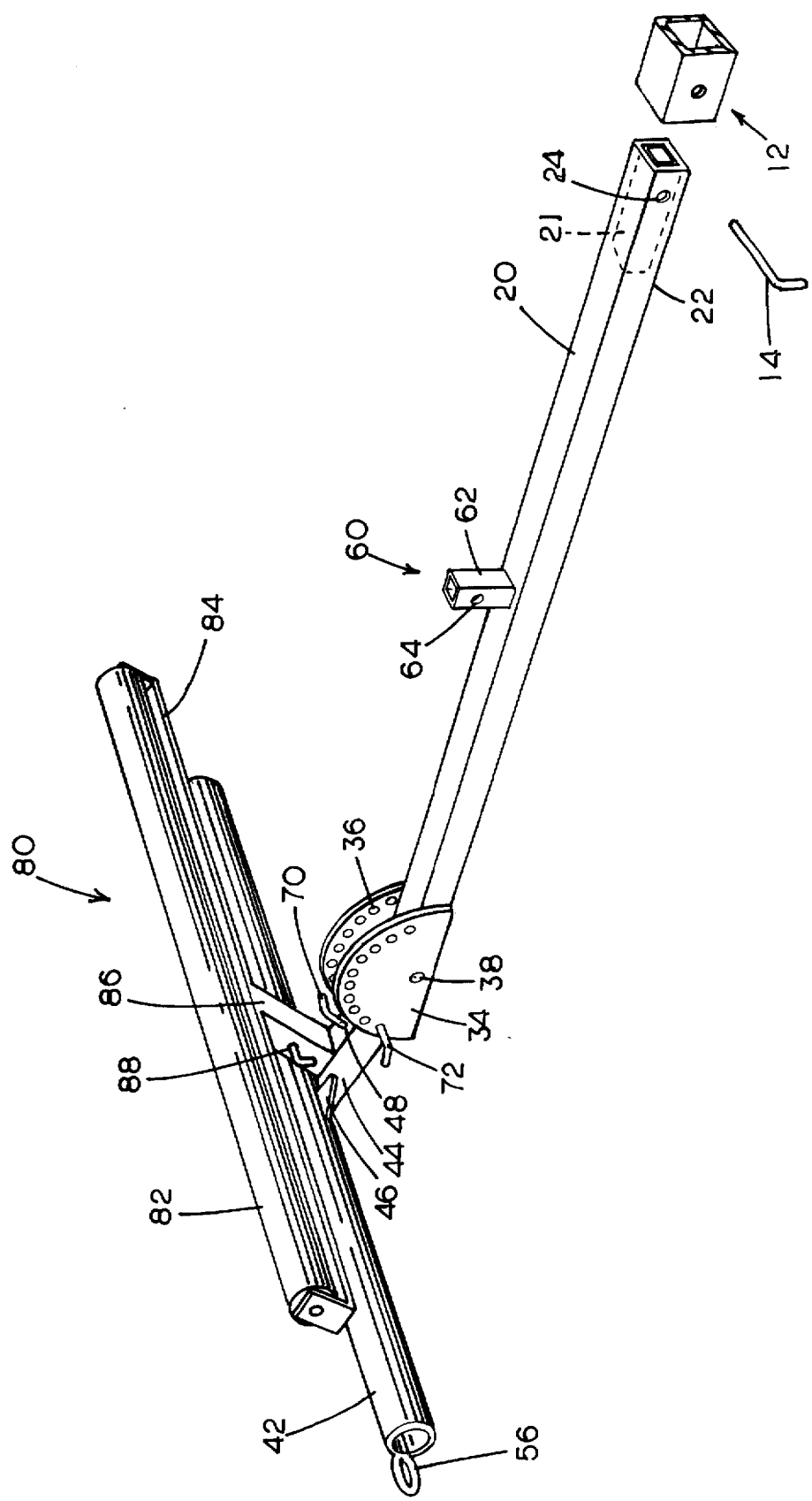

TRUCK BED EXTENDER

FIELD OF THE INVENTION

The present invention relates generally to vehicle-mounted, load-carrying devices, and more particularly to a truck bed extender for extending the load bed of a truck.

BACKGROUND OF THE INVENTION

It is often necessary to transport articles, such as lumber, which is longer than the load bed of a truck. Articles which are not substantially longer than the truck bed may be carried by opening the tail gate and allowing the articles to cantilever from the rear of the truck bed. Allowing the articles to cantilever from the rear end of a truck, however, may result in damage to the articles during transportation. Further, the articles may not be substantially longer than the truck bed may have a tendency to tip or slide out of the load bed.

Truck bed extenders which mount to a vehicle are known for transporting articles longer than the load bed of the vehicle. Typically, the truck bed extender includes one or more beams that extend rearwardly from the vehicle and a load support member which is connected to the beam(s). Articles which extend from the rear of the vehicle are supported by the load support member. Such truck bed extenders allow articles exceeding more than twice the length of the truck bed to be carried. Examples of prior art devices are shown in U.S. Pat. No. 5,451,088 to Broad; U.S. Pat. No. 5,458,389 to Young; and U.S. Pat. No. 5,120,102 to Cumbie.

One problem with prior art truck bed extenders is that there is no convenient way to conveniently store the truck bed extender so that it is out of the way but readily accessible. For example, the patent to Young contemplates that the truck bed extender will be disassembled and stored in the vehicle when not in use. Thus, the truck bed extender consumes space within the vehicle which might otherwise be used for other articles. Therefore, what is needed is a truck bed extender that can be conveniently stored in a location that is out of the way and yet be readily accessible when needed.

SUMMARY AND OBJECTS OF THE INVENTION

The present invention is a truck bed extender which mounts to a vehicle to provide support for articles longer than the truck bed. The truck bed extender includes a main beam which fits into a standard box receiver for a hitch and extends rearwardly from the vehicle. A load support is detachably mounted at the free end of the main beam. The load support includes a support bar that extends transversely to the main beam on which the articles being transported rest. When not in use, the load support detaches from the main beam and is re-mounted in a storage position. The truck bed extender can then be mounted to the box receiver so that both the main beam and load support extend transversely with respect to the vehicle generally parallel to the vehicle's bumper. The truck bed extender is therefore readily accessible and does not take up space within the vehicle which can be used to transport other articles.

In another aspect of the present invention, the load support includes a height adjustment mechanism. In one embodiment, the height adjustment mechanism comprises a load support mount which is pivotally attached to the main beam. To adjust the height of the load support, the load support is rotated in a vertical plane. Height adjustment may also be accomplished by means of two telescoping members.

BRIEF DESCRIPTION OF THE DRAWINGS

FIG. 2 is a perspective view of the truck bed extender showing the load support in a storage position.

FIG. 3 is a detailed view of the height adjustment mechanism for the load support.

FIG. 4 is a perspective view of the truck bed extender showing an optional roller attachment.

DETAILED DESCRIPTION OF THE INVENTION

Figure 1:
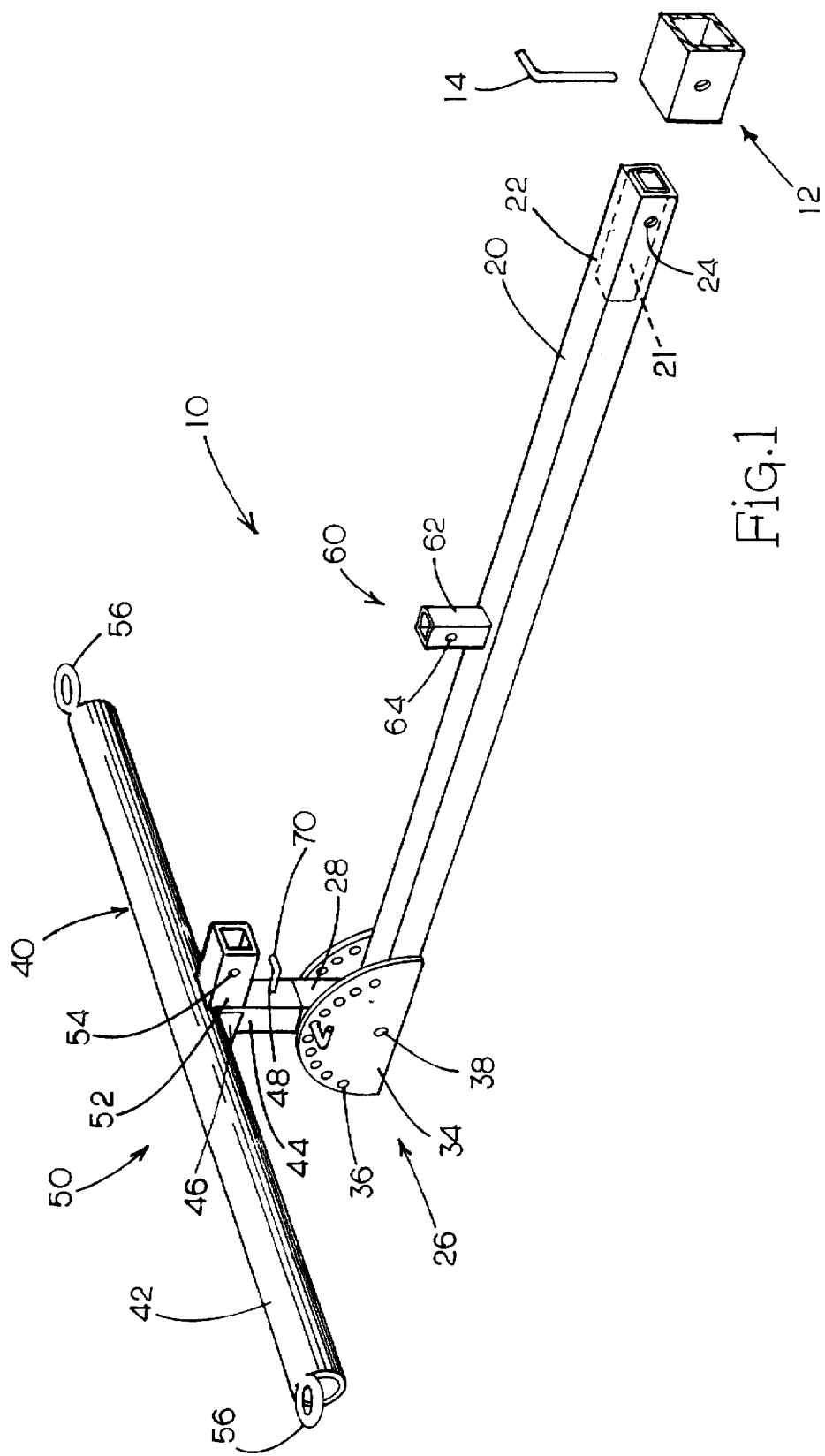
FIG. 1 is a perspective view of the truck bed extender showing the load support in a use position.

Referring now to the drawings, and particularly to FIG. 1, the truck bed extender of the present invention is shown therein and indicated generally by the numeral 10. The truck bed extender 10 includes a main beam 20 which attaches to a standard box receiver 12 for a hitch, and a load support 40 which detachably mounts to the main beam 20. The box receiver 12 mounts to a vehicle in a conventional manner well known to those skilled in the art. The main beam 20 extends rearwardly from the vehicle and the load support 40 mounts to the free end of the beam 20 to support loads that extend beyond the rear end of the vehicle.

As shown in the figures, the main beam 20 is constructed of a two-inch by two-inch by quarter-inch square steel tubing. One end of the main beam 20, referred to herein as the insert end 22, fits into the box receiver 12 on the vehicle and is secured by an anchor pin 14 which passes through a transverse opening 24 in the insert end 22 of the main beam 20. In the preferred embodiment, a reinforcing member 21 constructed of one-and-one half inch by one-and-one half inch steel tubing is welded into the insert end 22 to provide greater strength and rigidity.

A first mount, indicated generally at 26, is attached to the free end of the main beam 20. The first mount 26 is used to mount the load support 40 in a normal use position. A second mount, indicated generally at 60, is attached to the main beam 20 approximately midway between the two ends. The purpose of the second mount 60 is to secure the load support 40 in a storage position when the truck bed extender 10 is not being used.

The load support 40 is adapted to mount to either the first mount 26 during use, or to the second mount 60 during storage. The load support 40 comprises a t-shaped member including a support bar 42 and a support column 44. The support bar 42 is preferably a two-inch round steel tube. The support column 44 is a two-inch by two-inch by quarter-inch square steel tube which is welded to the center of the support bar 42. Triangular braces 46 are provided to add additional strength and rigidity to the load support structure.

The load support 40 includes a hitch connector 50 for mounting the truck bed extender 10 to a vehicle during storage. The hitch connector 50 comprises a tubular member 52 constructed of two-inch by two-inch by quarter-inch tubing. The tubular member 52 extends perpendicularly from one side of the support column 44 to which it is welded. A transverse opening 54 extends through the tubular member 52 to accommodate the anchor pin 14 as will be hereinafter described.

The load support 40 also includes a pair of tie-down rings 56 welded to opposite ends of the support bar 42. A cord, rope or chain can be extended over the articles being transported and secured to tie-down rings 56 to hold the load in place. Vertical posts (not shown) could also be provided at the opposing ends of the support bar 42 to keep the load from slipping off the ends of the support bar 42. Such posts could be used in additional to or in place of tie-down rings 56.

As previously indicated, the first mount 26 is used to mount the load support 40 in a use position. The first mount 26 comprises a tubular member 28 constructed of two-inch by two-inch by quarter-inch steel tubing. An extension member 30 projects from an upper end on the tubular member 28. The extension member 30 is constructed of one-and-one-half inch by one-and-one-half inch by quarter-inch steel tubing. A part of the extension member 30 extends into the tubular member 28 and is secured by spot welding. The protruding portion of the extension member 30 is adapted to fit inside the lower end of the support column 44 of the load support 40. The extension member includes a transverse opening 32 which aligns with the transverse opening 48 in the support column 44. A connecting pin 70 extends through the transverse openings 48 and 32 to secure the load support 40 to the mount 26.

In the preferred embodiment of the invention, the load support 26 is pivotally attached to the main beam 20. More particularly, an adjustment plate 34 is fixed to the free end of the main beam 20 by any suitable means such as by welding. The tubular member 28 of the load support 26 is pivotally connected to the adjustment plate 34 by a bolt 38 which serves as a pivot member. The adjustment plate 34 includes a series of angularly spaced adjustment holes 36 which align with a transverse opening (not shown) in the tubular member 28. The tubular member 28 can be secured in a plurality of different angular positions by aligning the transverse opening in the tubular member 28 with a selected adjustment hole 36 in the adjustment plate 34 and inserting the adjustment pin 72. It will be readily apparent to those of ordinary skill in the art that the height of the support bar 42 will vary depending upon the angle of the mount 26 with respect to the main beam 20. Thus, the rotating movement of the mount 26 allows for some vertical adjustment of the support bar 42.

In another embodiment of the invention, the tubular member 28 could be fixed to the main beam 20 so as to extend vertically upward from the main beam 20. In this embodiment, a series of transverse openings 32 would be vertically spaced on the extension member 30. Height adjustment would be made by raising and lowering the load support 44 until the transverse opening 48 in the support column 44 aligned with one of the transverse openings 32 in the extension member 30 and then inserting the connecting pin 70 through the aligned openings.

The second mount 60 comprises a tubular member 62 constructed of one-and-one-half inch by one-and-one-half inch by quarter-inch square steel tubing. The tubular member 62 is permanently fixed to the main beam 20 by any suitable means such as by welding. The tubular member 62 fits into the lower end of the support column 44 and includes a transverse opening 64 which aligns with the transverse opening 48 of the support column 44. The load support 40 is secured to the second mount 50 by lowering the load support 40 onto the tubular member 62 so that the transverse opening 48 in the support column 44 aligns with the transverse opening 64 in the tubular member 62 and then inserting the connecting pin 70 through the aligned openings 32 and 48. When secured to the second mount 60, the support bar 42 of the load support 40 extends parallel to the main beam 20. In this position, the entire assembly (main beam and load support) can be mounted in a storage position to the vehicle by inserting the hitch connector 50 into the box receiver 12. When mounted to the vehicle in this manner, the main beam 20 and load support 40 extend transversely with respect to the vehicle.

To use the truck bed extender 10 of the present invention, the load support 40 is mounted to the first mount 26. The support column 44 is lowered onto the extension member 30 of the first mount 26 so that the extension member 30 extends into the lower end of the support column 44. The load support 40 is mounted so that the support bar 44 extends transversely to the main beam 20. The connecting pin 70 is then inserted through the transverse opening 48 in the support column. The connecting pin will also extend through the transverse opening 32 in the extension member 30 thereby securing the load support 40 in place.

The insert end 22 of the main beam 20 is inserted into the box receiver 12 which is mounted to the vehicle. The main beam 20 is secured to the box receiver 12 by inserting the anchor pin 14 so that it passes through transverse openings in both the box receiver and main beam 20.

Once the load support 40 is mounted to the main beam 20 and the truck bed extender 10 is secured to the box receiver 12, the height of the load support 40 can be adjusted to the desired height. The maximum height is obtained when the tubular member 22 extends vertically upward from the main beam 20 so that it is perpendicular to the main beam 20. To reduce the height of the support bar 42, the tubular member 22 may be rotated either forwardly or rearwardly in a vertical plane until the transverse opening in the tubular member 28 aligns with one of the adjustment holes 36 in adjustment plate 34. When the desired height is obtained, the adjustment pin 72 is inserted through the aligned openings. The load support 40 could be rotated forwardly or rearwardly depending upon the length of the articles being transported. For very long articles, the load support 40 would preferably be rotated rearwardly since rotation in this direction effectively lengthens the truck bed extender 10. On the other hand, when the articles being transported do not extend far beyond the support bar 42, then the load support 40 should be rotated forwardly. The forward rotation effectively shortens the length of the truck bed extender 10.

When the truck bed extender 10 is not being used, the load support 40 is detached from the first mount 26 and re-attached to the second mount 60. The load support 40 is attached to the second mount 60 by lowering the support column 44 over the tubular member 62. In this position, the load support 40 extends parallel to the main beam. The load support 40 is then secured in place by inserting the connecting pin 70 through the aligned openings 48 and 64 in the load support 40 and tubular member 62, respectively. The truck bed extender can then be mounted to the vehicle by inserting the hitch connector 50 into the box receiver 12 as previously described and securing it by inserting the anchor pin 14 through the opening 54 in the hitch connector 50.

Referring now to FIG. 4, a roller attachment 80 for the truck bed extender 10 is shown. The roller attachment includes a roller 82 which is rotatably mounted in a roller bracket 84. The roller bracket 84 comprises an elongated member having upturned portions at either end to support the roller 82. A support column 86 extends downward from the underside of the roller bracket 84 and includes a transverse opening 88.

The roller attachment 80 mounts to the tubular member 52 so that the transverse opening 88 in the support column 86 aligns with the transverse opening 54 in the tubular member 52. A pin (not labeled) is inserted through the aligned openings to secure the roller attachment 80 to the tubular member 52. Once the roller attachment 80 is mounted to the load support 40, the load support 40 can be rotated downward as shown in FIG. 4. As the load support 40 is rotated downward, the roller attachment 80 engages the load to take the weight of the load off the support bar 42. The roller attachment 80 allows the articles to be unloaded more easily without damaging the articles.

The roller attachment 80 could also be used in place of the load support 40 by mounting the roller attachment 80 to the first mount 26.

Based on the foregoing, it is apparent that the truck bed extender 10 of the present invention can be easily and conveniently stored when not in use, yet be readily accessible when needed. Further, since the truck bed extender 10 of the present invention mounts to a standard box receiver when it is not being used, it will not consume space within the vehicle.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A truck bed extender for a vehicle having a longitudinal axis, comprising:
   a) a main beam having a first end and a second end and adapted to engage a box receiver on said vehicle proximate said first end so as to extend rearwardly from said vehicle and substantially parallel to said longitudinal axis;
   b) a load support for supporting loads that extend beyond the rear of the vehicle, said load support including a support bar that normally extends transversely with respect to said main beam and with respect to said longitudinal axis when disposed in a use position; and wherein said load support is moveably connected to said main beam between a first position proximate said second end and a second position between said first position and said first end;
   c) a mount for mounting the load support in a storage position wherein said support bar extends substantially parallel to said main beam.

2. The truck bed extender of claim 1 wherein said mount comprises a tubular member attached to said main beam.

3. The truck bed extender of claim 2 wherein said load support includes a tubular support column which engages the tubular member.

4. The truck bed extender of claim 1 further including an auxiliary hitch insert connected to either said main beam or said load support for engaging said box receiver when said load support is in a storage position.

5. The truck bed extender of claim 1 further including tie-down loops attached at opposite ends of said load support beam.

6. The truck bed extender of claim 1 further including adjustment means for adjusting the height of the load support when it is in a use position.

7. The truck bed extender of claim 6 wherein said load support is pivotally connected to said main beam to allow height adjustment by pivoting the load support in a vertical plane.

8. The truck bed extender of claim 1 wherein said load support includes a roller for engaging said load.

9. The truck bed extender of claim 8 wherein said roller is movable between an engaged position and a disengaged position with respect to said load.

10. A truck bed extender comprising:
    a) a main beam having a first end adapted to engage a box receiver on a vehicle so as to extend rearwardly from said vehicle;
    b) a detachable load support including a load support beam for supporting a load extending from the rear of said vehicle;
    c) a first mount for mounting said load support in a use position so that the load support beam extends generally perpendicular to said main beam;
    d) a second mount for mounting said load support in a storage position so that the load support beam extends generally parallel to said main beam; and
    e) an auxiliary hitch insert connected to either said main beam or said load support for engaging said box receiver when said load support is in a storage position.

11. The truck bed extender of claim 10 wherein said first mount includes a tubular member engaged by said load support.

12. The truck bed extender of claim 11 wherein said first mount includes height adjustment means to adjust the height of the load support beam.

13. The truck bed extender of claim 11 wherein said tubular member is pivotally connected to said main beam so that adjustment is made by changing the angle of said tubular member with respect to said main beam.

14. The truck bed extender of claim 12 wherein said height adjustment means includes an adjustment plate fixed to said main beam, said tubular member being pivotally connected to said adjustment plate so as to pivot in a vertical plane.

15. The truck bed extender of claim 14 wherein said adjustment plate includes a series of angularly spaced adjustment holes, and wherein said tubular member includes a transverse opening that aligns with said adjustment holes in said adjustment plate, said tubular member being secured by an adjustment pin that extends through one of said adjustment holes in said adjustment plate and said transverse opening in said tubular member.

16. The truck bed extender of claim 10 further including tie-down loops attached at opposite ends of said load support beam.

17. The truck bed extender of claim 10 wherein said load support includes a roller for engaging said load.

18. The truck bed extender of claim 17 wherein said roller is movable between an engaged position and a disengaged position with respect to said load.

19. A truck bed extender, comprising:
    a) a main beam adapted to engage a box receiver on a vehicle so as to extend rearwardly from said vehicle;
    b) a load support mounted to said main beam for supporting loads that extend beyond the rear of the vehicle, said load support including a support bar that normally extends transversely with respect to said main beam when disposed in a use position;
    d) an auxiliary hitch insert connected to either said main beam or said load support for engaging said box receiver when said load support is in a storage position; and
    c) a mount for mounting the load support in a storage position where it extends generally parallel to the main beam.

20. A truck bed extender, comprising:

a) a main beam adapted to engage a box receiver on a vehicle so as to extend rearwardly from said vehicle;

b) a load support including a roller for engaging said load and mounted to said main beam for supporting loads that extend beyond the rear of the vehicle, said load support including a support bar that normally extends transversely with respect to said main beam when disposed in a use position; and c) a mount for mounting the load support in a storage position where it extends generally parallel to the main beam.

21. The truck bed extender of claim 20 wherein said roller is movable between an engaged position and a disengaged position with respect to said load.

* * * * *